(12) United States Patent
Suga

(10) Patent No.: US 7,014,359 B2
(45) Date of Patent: Mar. 21, 2006

(54) TEMPERATURE MEASURING DEVICE

(75) Inventor: Taro Suga, Hadano (JP)

(73) Assignee: Yokogawa Denshikiki Co., Ltd., Tokyo (JP)

( * ) Notice: Subject to any disclaimer, the term of this patent is extended or adjusted under 35 U.S.C. 154(b) by 0 days.

(21) Appl. No.: 10/077,086

(22) Filed: Feb. 15, 2002

(65) Prior Publication Data

US 2002/0131474 A1    Sep. 19, 2002

(30) Foreign Application Priority Data

Mar. 13, 2001    (JP) ............................ P2001-070190

(51) Int. Cl.
GO1K 1/08    (2006.01)
GO1K 1/14    (2006.01)
GO1K 13/02    (2006.01)
B64D 15/00    (2006.01)

(52) U.S. Cl. ...................... 374/208; 340/962; 374/148; 374/141; 244/134 R; 244/134 E

(58) Field of Classification Search ................ 374/141, 374/144, 148, 135, 208, 138, 109; 340/580, 340/581, 584, 962, 945; 244/134 R, 134 C, 244/134 E; 73/170.02, 170.26
See application file for complete search history.

(56) References Cited

U.S. PATENT DOCUMENTS

| | | | | |
|---|---|---|---|---|
| 3,000,213 A | * | 9/1961 | Eves et al. | |
| 3,348,414 A | * | 10/1967 | Walters et al. | |
| 3,512,414 A | * | 5/1970 | Rees | |
| 3,623,368 A | * | 11/1971 | Decker, Jr. | |
| 4,152,938 A | | 5/1979 | Danninger | |
| 4,244,222 A | * | 1/1981 | Hoyer et al. | |
| 4,595,298 A | * | 6/1986 | Frederick | |
| 4,605,315 A | * | 8/1986 | Kokoszka et al. | |
| 4,765,751 A | * | 8/1988 | Pannone et al. | |
| 4,902,139 A | * | 2/1990 | Adiutori | |
| 4,916,715 A | * | 4/1990 | Adiutori | |
| 5,003,295 A | * | 3/1991 | Kleven | 340/581 |
| 5,039,128 A | * | 8/1991 | Romuno | 280/816 |
| 5,043,558 A | * | 8/1991 | Byles | |
| 5,088,277 A | * | 2/1992 | Schulze | 6/39.093 |
| 5,226,731 A | * | 7/1993 | Allen | 374/144 |
| 5,313,202 A | * | 5/1994 | Hansman et al. | 340/962 |
| 5,331,849 A | | 7/1994 | Hedberg et al. | |
| 5,438,865 A | * | 8/1995 | Greene | 73/180 |
| 5,678,926 A | * | 10/1997 | Stansfeld et al. | 374/208 |

(Continued)

FOREIGN PATENT DOCUMENTS

DE    3508787 A    *    9/1985

(Continued)

*Primary Examiner*—Gail Verbitsky
(74) *Attorney, Agent, or Firm*—Frishauf, Holtz, Goodman & Chick, P.C.

(57) ABSTRACT

A temperature measuring device is provided which measures the total temperature T1 of an airflow based on the measured temperature T of the airflow flowing over the surface of an approximately blade-shaped casing arranged within the airflow flowing into an engine of the aircraft. The shape of the casing is set such that lumps of ice and snow, which may form on a surface of the casing and which may thereafter detach from the casing and strike the engine, detach at a stage of growth at which they do not cause damage to the engine.

5 Claims, 6 Drawing Sheets

U.S. PATENT DOCUMENTS

| | | | |
|---|---|---|---|
| 5,731,507 A | 3/1998 | Hagen et al. | |
| 5,752,674 A * | 5/1998 | Mears et al. | 244/134 R |
| 6,109,783 A * | 8/2000 | Dobler et al. | 374/141 |
| 6,422,743 B1 * | 7/2002 | Nirmalan et al. | 374/43 |
| 6,622,556 B1 * | 9/2003 | May | 73/202.5 |
| 6,819,265 B1 * | 11/2004 | Jamieson et al. | 340/962 |
| 2002/0064205 A1 * | 5/2002 | Tubbs | 374/131 |
| 2003/0155467 A1 * | 8/2003 | Petrenko | 244/134 R |

FOREIGN PATENT DOCUMENTS

| | | |
|---|---|---|
| EP | 0835804 A2 | 4/1998 |
| FR | 2680872 A1 | 3/1993 |
| JP | 8-501623 A | 2/1996 |
| JP | 9-504102 A | 4/1997 |
| JP | 2000-292267 A | 10/2000 |
| WO | WO 00/31508 A1 | 6/2000 |

* cited by examiner

TEMPERATURE MEASURING DEVICE

BACKGROUND OF THE INVENTION

1. Field of the Invention

The present invention relates to a temperature measuring device which is positioned within the airflow flowing into an engine of an aircraft or an external surface of the aircraft, and which measures the temperature of the airflow.

2. Description of the Related Art

Conventionally, on aircraft on which engines are mounted, temperature measuring devices which measure the temperature of airflows are arranged in the air intake or near the intake of the engines, or on an external surface of the aircraft.

The air to the outside of a cruising aircraft forms an airflow at high speed, and it is necessary to measure the total temperature of this airflow. In order to measure the total temperature of the airflow, for example, a temperature measuring device having a structure in which the airflow is guided into a casing having a sensor located inside, a stagnation point in the airflow is formed by the airflow striking the inner surface of the casing and the stagnation temperature at this stagnation point is measured. Alternatively, a temperature measuring device having a structure in which the total temperature is measured by means of restricting the flow rate of the airflow passing through a passage can be used.

In addition, in Japanese Patent Application No. Hei 11-95563 previously filed by the applicant of the present application, a temperature measuring device in which a sensor is provided in the surface of a blade-shaped casing is described. Under practical conditions, this temperature measuring device derives the total temperature by measuring the temperature of the airflow passing over the surface of the casing from the fact that the temperature of the airflow passing over the surface of the casing and causing friction approximates the total temperature at the stagnation point.

However, when an aircraft is cruising in conditions of ice and snow, with the above-mentioned temperature measurement device having a structure in which the airflow strikes the inner wall of the casing, there is the problem that since the ice and snow adhere to and build up inside the casing and on the periphery of the air intake, the air intake becomes blocked, the airflow cannot be guided into the air intake, and it is not possible for the temperature to be measured. In addition, there is the problem that ice and snow adhere to the sensor, accurate temperature measurement is prevented, and the sensor itself becomes damaged. In the same way, the temperature measurement device which has a structure through which the airflow passes also has the problem that the passage becomes blocked by the adhesion of ice and snow, and temperature measurement becomes impossible.

In addition, according to the temperature measurement device described in Japanese Patent Application No. Hei 11-95563, a structure is adopted in which the adhesion and build up of ice and snow on the sensor or in the vicinity of the sensor does not occur. Therefore, problems such as the sensor becoming damaged, or accurate temperature measurement being prevented have been solved. However, when lumps of ice and snow which adhere to the casing become large and detach, these lumps of ice and snow strike the engine. the airframe or equipment of the aircraft, due to the airflow. Therefore, there is the problem that the engine, aircraft or the like will become damaged. It is possible to prevent the icing which causes this type of problem by heating the casing using an electric heater or high temperature engine bleed air, but the structure becomes complex and heavy, and accurate temperature measurement is difficult when the casing is heated.

SUMMARY OF THE INVENTION

In light of the above-mentioned problems, the present invention has an object of providing a temperature measuring device which can be used without the provision of a heating mechanism, with which accurate temperature measurement can be carried out, to which ice and snow do not readily adhere, and with which even when ice and snow do adhere, the temperature measuring device itself is not damaged, and the engine or the like are not damaged when the ice and snow detach.

In order to achieve the above-mentioned object, the present invention is a temperature measuring device which comprises an approximately blade-shaped casing arranged within the airflow flowing into an engine of an aircraft or on the exterior surface of an airframe of an aircraft, and which measures the total temperature T1 of an airflow based on the measured temperature T of the airflow flowing over surfaces of the casing, wherein the shape of the casing is set such that lumps of ice and snow which form on a surface of the casing in conditions of ice and snow, and which detach from the casing and are drawn into the engine or onto the airframe or equipment of the aircraft detach at a stage of growth at which they do not cause damage to the engine or the airframe or the equipment of the aircraft.

According to the present invention, even in conditions of ice and snow, since the casing is formed in a shape from which adhered lumps of ice and snow detach without growing to be large, and it is possible to derive the total temperature without the measurement of the stagnation temperature using a structure with which ice and snow accumulate readily, a heating mechanism for the prevention of the adhesion of ice and snow is not necessary, and temperature measurement which is more accurate than conventional devices is possible. In addition, there is no damage to the temperature measuring device due to ice and snow, and furthermore, there is no damage to the engine or to the airframe or the equipment of the aircraft due to the impact of lumps of detached ice and snow. In other words, according to the present invention, it is possible to obtain by means of a simple construction a temperature measuring device with which accurate temperature measurement is possible without damage to the engine, and which does not break readily.

In addition, when the angle of inclination of each blade surface of the casing with respect to the direction of the line of flow of the airflow is specified so that lumps of ice and snow detach at a stage of growth at which they do not cause damage to the engine or the airframe or the equipment of the aircraft, it is difficult for the lumps of ice and snow to become adhered to the leading edge and grow rearward. In addition, since the surface area for adhesion on the casing is small, adhesive strength for the casing is weak. Consequently, the growth of ice and snow can be controlled, it is possible for the ice and snow to detach readily, and therefore, it is possible to obtain a temperature measuring device which more reliably does not cause damage to the engine.

In addition, when the width of the leading edge of the casing with respect to the direction of the line of flow of the airflow is specified so that lumps of ice and snow detach at a stage of growth at which they do not cause damage to the engine or the airframe or the equipment of the aircraft, the surface area of the casing to which lumps of ice and snow can adhere is small, and the shearing strength of the adhered section is weak, therefore, they break easily, and lumps of ice and snow do not adhere strongly to the casing. Consequently, it is possible to control the growth of ice and snow, and for the ice and snow to detach readily, therefore, it is possible to obtain a temperature measuring device which more reliably does not cause damage to the engine.

In addition, when the angle of inclination of the leading edge of the casing with respect to the direction of the line of flow of the airflow is specified so that the lumps of ice and snow detach at a stage of growth at which they do not cause damage to the engine or to the airframe or the equipment of the aircraft, the air resistance force exerted on the ice and snow by the airflow causes the ice and snow to detach readily, the ice and snow does not readily adhere to the lower part of the casing, and the adhesive force of the ice and snow does not become strong. Consequently, it is possible to control the growth of the ice and snow, and the ice and snow readily detaches, therefore, it is possible to obtain a temperature measuring device which more reliably does not cause damage to the engine or the like.

BEST MODE FOR CARRYING OUT THE INVENTION

In the following, embodiments of the present invention will be explained with reference to the figures.

Figure 1:
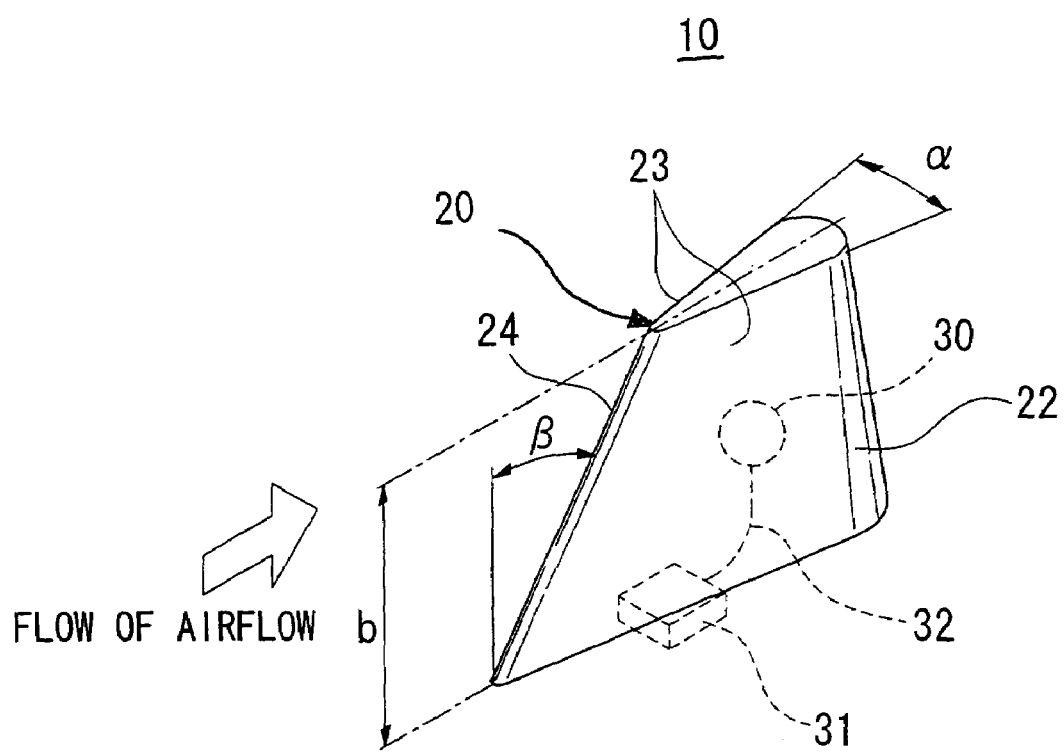
FIG. 1 is a perspective drawing showing an embodiment of the temperature measuring device according to a best mode of the present invention.

FIG. 1 is a perspective drawing showing an embodiment of the temperature measuring device of the present invention. This temperature measuring device 10 has a structure in which a temperature sensor 30 is built into a single wedge shaped casing 20 and the temperature measured by the temperature sensor 30 is transmitted to the exterior via an electric interface 31.

Figure 2:
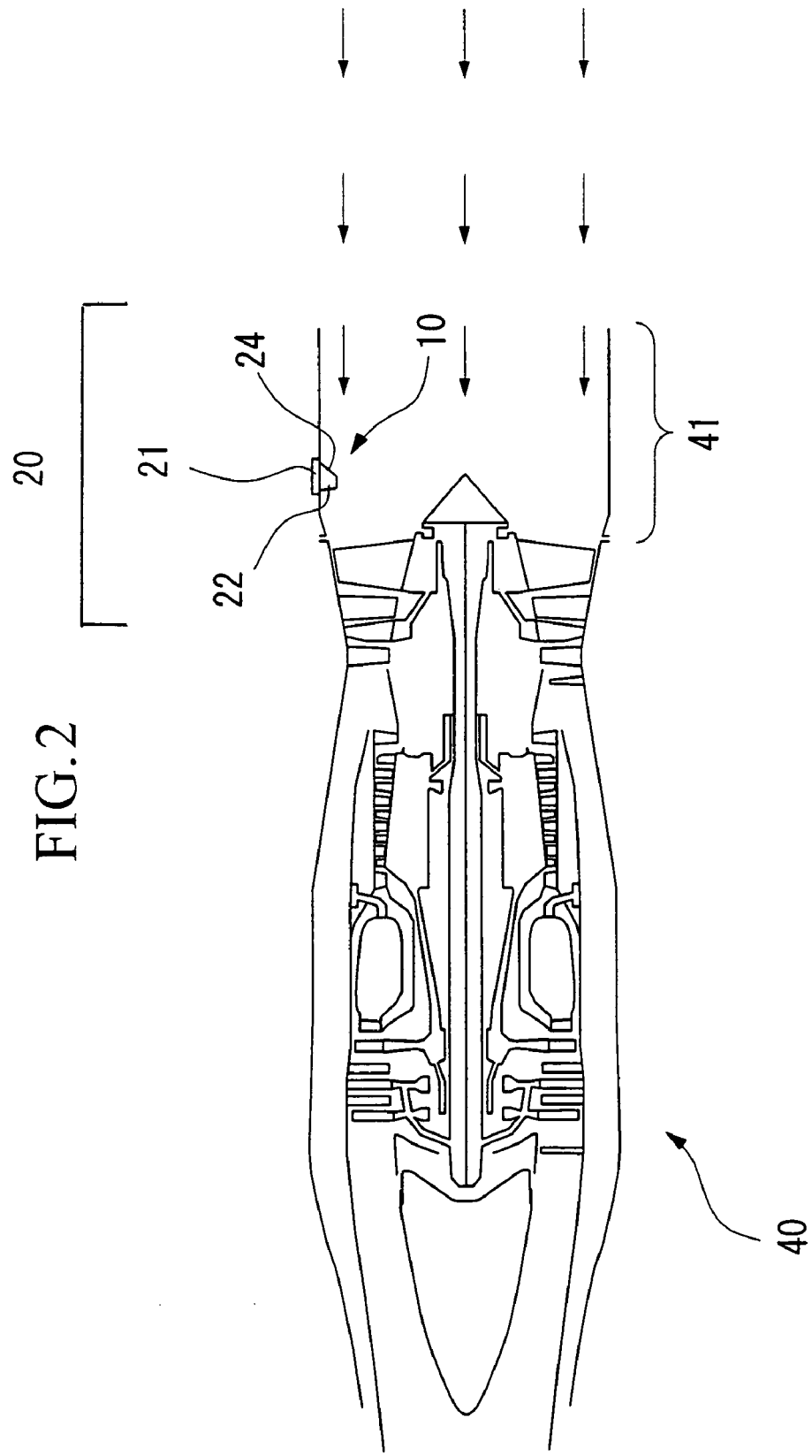
FIG. 2 is a cross-section showing the temperature measuring device according to a best mode of the present invention installed in an engine.

As shown in FIG. 2, casing 20 comprises a base 21 for the purpose of attaching the casing 20 to the airflow guide inlet 41 of the engine 40, and a sensor housing section 22. Sensor housing section 22 is formed so as to project from the base 21 into the airflow which is taken into the engine 40.

The sensor housing section 22 comprises two airflow traversing surfaces 23 which are arranged so that they are each at an angle of 9° with respect to the line of flow of the airflow and which together form a point angle α of 18°, and an inclined leading edge section 24 formed by a ridge of R 0.1 where these airflow traversing surfaces 23 (blade surfaces) meet, and having an angle of 55° (a sweptback angle β of 35°) with respect to the direction of the line of flow of the airflow when positioned within the airflow. The leading edge section 24 is arranged toward the upstream side within the airflow (to the right in FIG. 2). In addition, the two airflow traversing surfaces 23, which meet forming the leading edge section 24 as a ridge, rise up perpendicularly with respect to the base 21, and are arranged in line with the airflow. In addition, each surface of the sensor housing section 22 is connected and sealed without gaps.

The temperature sensor 30 uses, for example, a resistance temperature type sensor, a thermocouple, or the like, is provided within the sensor housing section 22 near the surface of the air current traversing surfaces 23, and is connected to electric interface 31 by lead 32. The temperature measured by the temperature sensor 30 is transmitted as an electrical signal via the electric interface 31 to an engine control device (not shown in the figures).

Figure 3A:
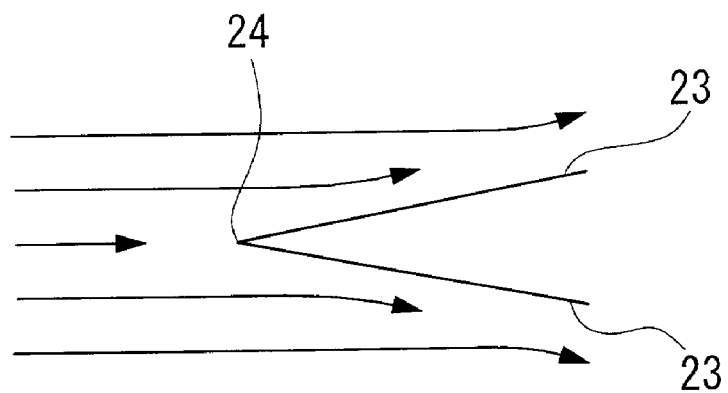
FIG. 3A is a first schematic diagram showing the way the airflow flows and the manner in which ice and snow adhere with respect to the casing according to the present invention.

A temperature measuring device 10 having the above-mentioned structure is attached to the top of the inside wall of the airflow guide inlet 41 of the engine 40 using the base 21, and is arranged such that when the aircraft is cruising, the airflow traversing surfaces 23 are in line with the airflow and the leading edge section 24 is toward the upstream side (FIG. 2). When an aircraft in which an temperature measuring device 10 has been provided on the engine 40 is cruising, the airflow is divided along both sides of the sensor housing section 22, and flows along the airflow traversing surfaces 23 (FIG. 3A).

Here, the temperature T measured by the present temperature measuring device 10 will be explained.

When the airflow is flowing along the airflow traversing surfaces 23, the air in the vicinity of the surface of the airflow traversing surfaces 23 generates heat due to friction due to the relative speeds of the airflow and the airflow traversing surfaces 23. Therefore, the measured temperature T measured by the temperature sensor 30 is a temperature which has been raised due to the heat from friction.

In addition, in general, the total temperature T1 of air having a static temperature T0 flowing at Mach M is represented by:

$$T1 = T0(1+(\kappa-1)/2 \times M^2) \qquad (1)$$

Wherein K is the specific heat ratio of air ($\approx 1.4$)

On the other hand, the measured temperature T of an airflow which flows over the surface of the airflow traversing surfaces 23 as in the present invention is, with respect to the static temperature T0, represented by:

$$T = T0(1 + r(\kappa-1)/2 \times M^2) \qquad (2)$$

Wherein: $r \approx Pr^{1/3} (\approx 0.9)$

Pr is the Prandtl Number of air ($\approx 0.71$)

From Formula (1) and Formula (2), between the total temperature T1 and the measured temperature T, there is a relationship of:

$$T1 = T \times (1 + 0.2 \times M^2)/(1 + 0.18 \times M^2)$$

In other words, there is only a slight difference between the total temperature T1 and the measured temperature T. For example, when M is 0.55, T1=1.006×T, and the difference between them is approximately 0.6%. Consequently, if ê and r are considered to be constant, the measured temperature T and the total temperature T1 become a function of the speed (Mach M) of the airflow. Therefore, it is possible to calculate an accurate total temperature T1 by compensation using this function. Alternatively, it is possible to allow this difference as an error value, and to take the measured temperature T to be the total temperature T1.

Next, the effect of the shape of the casing 20 on the growth and detachment of lumps of ice and snow L which adhere to the temperature measuring device 10 when an aircraft on which engine 40 is mounted is cruising in conditions of ice and snow will be explained.

Figure 3B:
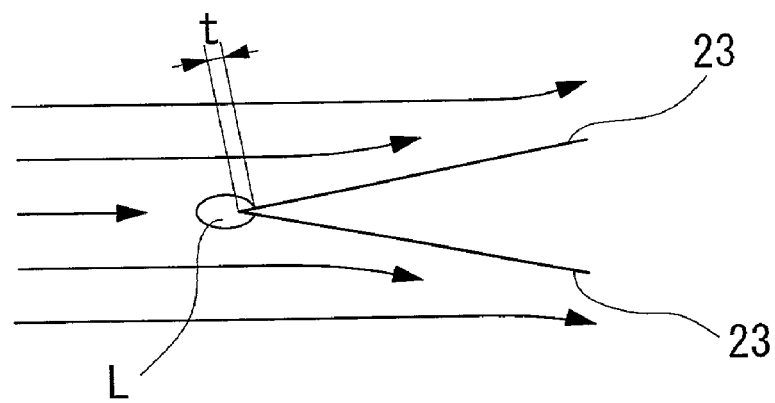
FIG. 3B is a second schematic diagram showing the way the airflow flows and the manner in which ice and snow adhere with respect to the casing according to the present invention.

When an aircraft is cruising in conditions of ice and snow, the airflow at or below the freezing point in which moisture is mixed flows into the air guide intake 41. Therefore, with regard to the temperature measuring device 10, the airflow strikes the leading edge section 24, icing occurs, and lumps of ice and snow L begin to grow (FIG. 3B). Air which contains moisture strikes the lumps of ice and snow L, icing the front surface of the lumps of ice and snow L, and blowing slightly along the sides of the airflow traversing surface 23. Therefore, the lumps of ice and snow L grow from the initially iced section in such a way that the front surface width p increases while the thickness s increases frontward (in the upstream direction) (FIG. 3C).

Figure 3C:
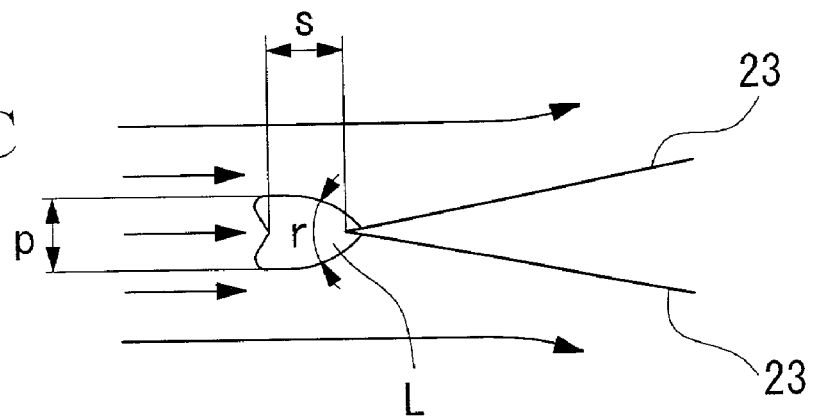
FIG. 3C is a third schematic diagram showing the way the airflow flows and the manner in which ice and snow adhere with respect to the casing according to the present invention.

As shown in FIGS. 3A to 3C, accompanying the growth of the lumps of ice and snow L, the front surface width p increases, and the surface area q of the front surface increases. Therefore, the air resistance received by the lumps of ice and snow L gradually increases. On the other hand, since the leading edge section 24 on which the lumps of ice and snow L become adhered is formed in a sharp angle, the width (adhesion width t) over which the lumps of ice and snow L adhere to the casing 20 is small, and even though the lumps of ice and snow L grow forward (in the upstream direction), they do not become large in the rearward direction (in the downstream direction). Therefore, the adhesion surface area u (=adhesion width t×height b of the leading edge section 24) does not increase. The smaller this adhesion surface area u, the weaker the adhesive strength of the lumps of ice and snow L with respect to the casing 20, and the cross-section of the lumps of ice and snow L in the vicinity thereof is small. Therefore, they break up easily, and consequently, the adhered lumps of ice and snow L detach easily from the casing 20.

In addition, when the lumps of ice and snow L grow and the force of air resistance becomes greater than the adhesive force (shearing strength) of the lumps of ice and snow L of the iced section, the lumps of ice and snow L of the iced section peel away from the leading edge section 24 (or the vicinity of the iced section breaks up), and the lumps of ice and snow L fall from the leading edge section 24. The lumps of ice and snow L which fall are blown downstream by the airflow and are drawn into the engine 40.

Figure 4A:
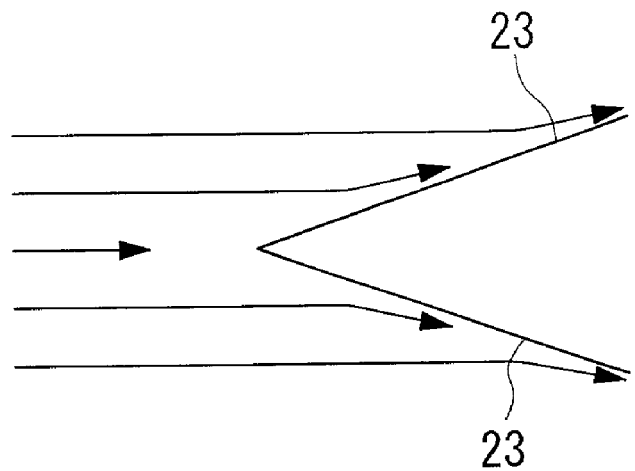
FIG. 4A is a first schematic diagram showing the way the airflow flows and the manner in which ice and snow adhere with respect to a casing.
Figure 4B:
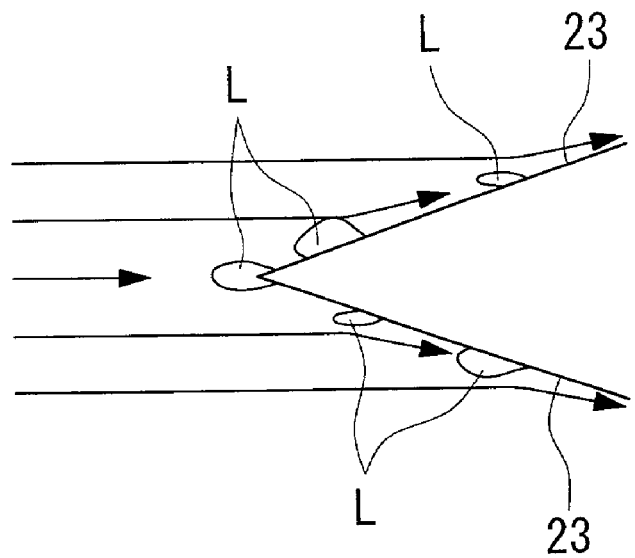
FIG. 4B is a second schematic diagram showing the way the airflow flows and the manner in which ice and snow adhere with respect to a casing.
Figure 4C:
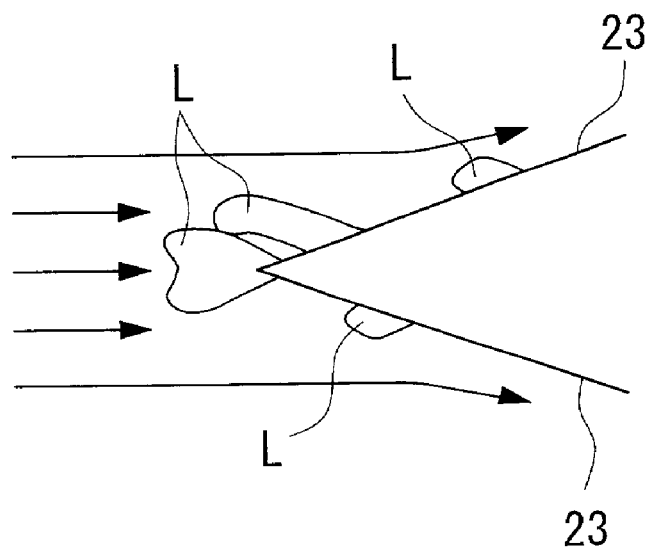
FIG. 4C is a third schematic diagram showing the way the airflow flows and the manner in which ice and snow adhere with respect to a casing.

Moreover, as shown in FIGS. 4A to 4C, when the angle of the airflow traversing surfaces 23 of the sensor housing section 22 is larger than 9° (and the point angle α is greater than 18°) with respect to the direction of the line of flow of the airflow, drops of water which strike the airflow traversing surfaces 23 increase. Therefore, ice and snow adheres not only to the leading edge section 24, but also to the airflow traversing surfaces 23 (FIG. 4B). The ice and snow which adhere to the airflow traversing surfaces 23 grow forward and become united with the ice and snow which is adhered to the leading edge section 24. As shown in FIG. 4C, these lumps of ice and snow L form large lumps of ice and snow L, therefore, the adhesion surface area u becomes large, and the adhesive force and the shearing strength of the lumps of ice and snow L increase. Consequently, the lumps of ice and snow L do not detach readily from the casing 20, and therefore they grow large. When lumps of ice and snow L which have grown large detach and are drawn into the engine 40, the engine 40 is damaged. The limit (=9°) for the angle of the airflow traversing surfaces 23 with respect to the direction of the line of flow of the airflow at which lumps of ice and snow L do not grow large was obtained by experimentation using an ice and snow wind tunnel.

Figure 5A:
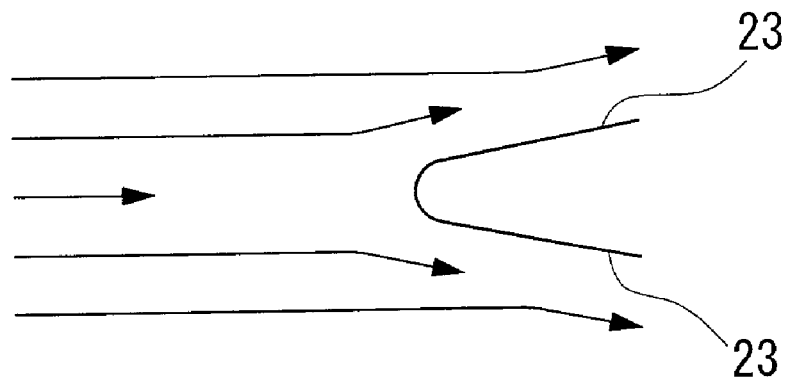
FIG. 5A is a first schematic diagram showing the way the airflow flows and the manner in which ice and snow adhere with respect to a casing.
Figure 5B:
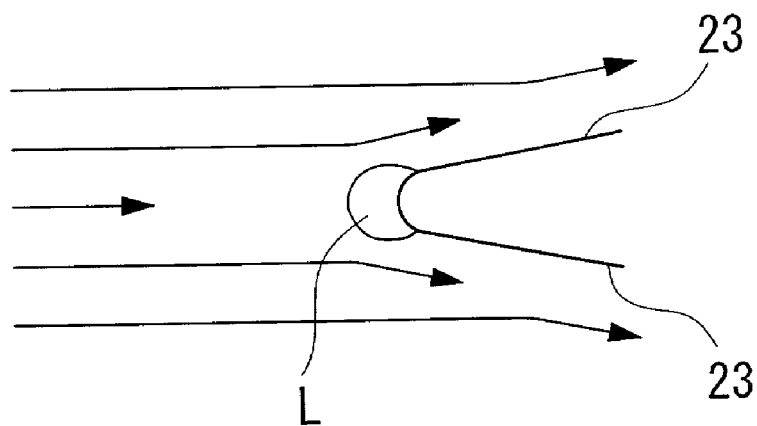
FIG. 5B is a second schematic diagram showing the way the airflow flows and the manner in which ice and snow adhere with respect to a casing.
Figure 5C:
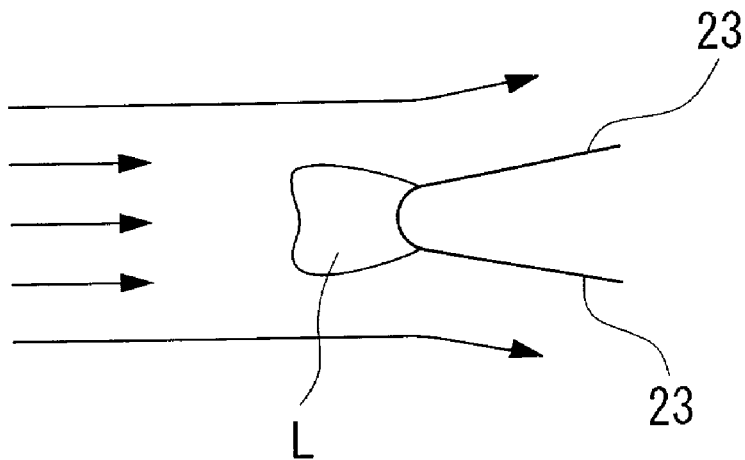
FIG. 5C is a third schematic diagram showing the way the airflow flows and the manner in which ice and snow adhere with respect to a casing.

In addition, as shown in FIGS. 5A to 5C, when R of the leading edge section 24 is greater than 0.5 mm or the width is greater than 1 mm, the surface area which the air strikes is large. In other words, since the adhesion width t is large, the adhesion surface area u is large, and the airflow flows around rearward of the lumps of ice and snow L causing ice and snow to adhere, the adhesion surface area u is increased further. Therefore, the adhesive force and the shearing strength of the lumps of ice and snow L become stronger. Consequently, the lumps of ice and snow L do not detach readily from the casing 20 and grow large, and when lumps of ice and snow L which have grown large detach and fly into the engine, the engine is damaged. The limits (R is 0.5 or a width of 1 mm) for the shape of the leading edge section 24 with which lumps of ice and snow L do not grow large were obtained by calculation and experimentation in an ice and snow wind tunnel.

Figure 6A:
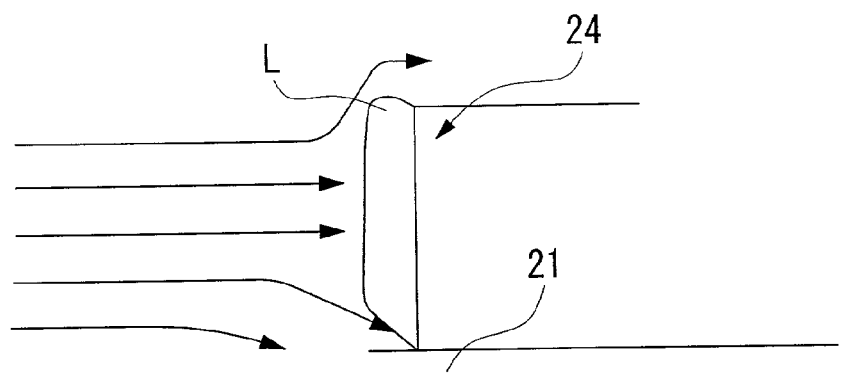
FIG. 6A is a first schematic diagram showing the way the airflow flows and the manner in which ice and snow adhere with respect to a casing.
Figure 6B:
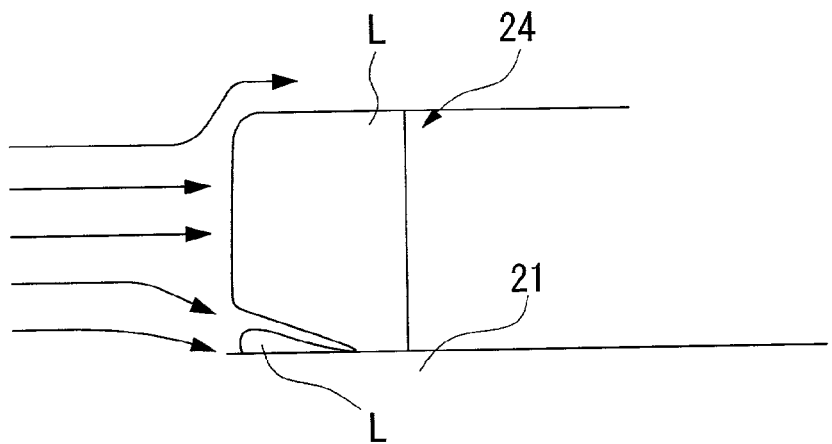
FIG. 6B is a second schematic diagram showing the way the airflow flows and the manner in which ice and snow adhere with respect to a casing.
Figure 6C:
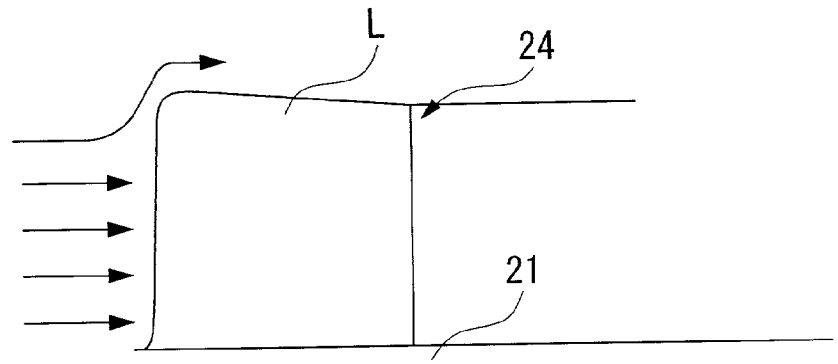
FIG. 6C is a third schematic diagram showing the way the airflow flows and the manner in which ice and snow adhere with respect to a casing.

In FIGS. 6A to 6C, as an example of the sweptback angle β of the leading edge section 24 being less than 30° (the leading edge section 24 is inclined at an angle greater than 60° with respect to the direction of the line of flow of the airflow), a situation in which the sweptback angle β is 0° is shown. When the airflow strikes the leading edge section 24, the ice and snow which adhere grow forward. At the initial stage of icing, there is less icing at the portion close to the base 21 where the flow rate of the airflow is slow (FIG. 6A). In addition, as the icing progresses, the airflow is guided between the base 21 and the lump of ice and snow L, and ice and snow also adhere to the base 21 (FIG. 6B). Thus, the lump of ice and snow L grows on the leading edge section 24 (FIG. 6C). Consequently, since the lump of ice and snow L is adhered to the base 21 and the leading edge section 24, the adhesive force is strong, and the lump of ice and snow L grows large. Accordingly, it is preferable that the angle of inclination of the leading edge section of the casing with respect to the direction of the line of flow of the airflow is less than 60°.

Estimates were made for the growth and detachment of lumps of ice and snow L for a situation in which this type of temperature measuring device 10 is used. In making these estimates, the shearing strength of a lump of ice and snow L was assumed, and when the shearing stress on a lump of ice and snow L exceeded this shearing strength, the lump of ice and snow L was taken to have detached, and the mass of the lumps of ice and snow L at the time of detaching was calculated. The factors involved in determining the shearing stress are as follows.

Speed, density, total temperature T1 and moisture content of the air

The point angle α

The sweptback angle β

The width a, the height b, and the radius R of the leading edge section 24

The front surface width p; the surface area q of the front surface, the spreading angle r, the thickness s, the adhesion width t, and the adhesion surface area u of a lump of ice and snow L The intake of a lump of ice and snow L of up to 60 g is permissible for an engine 40 equipped with the present temperature measuring device 10. According to the estimates, the lumps of ice and snow L grow, the shearing stress increases, and the shearing strength is exceeded when the mass of a lump of ice and snow L is 7 g. This is calculated from estimates to be approximately 19 seconds after the icing begins. Additionally, estimated results were obtained showing that after approximately 39 seconds after the start of icing, the shearing stress acting on a lump of ice and snow L would exceed two times the shearing strength, and even if a lump of ice and snow L continued to grow without detaching until this point in time, the mass of the lump of ice and snow L would be approximately 28 g, and this is a mass which is sufficiently permissible if it were drawn into the engine 40. Consequently, by means of the temperature measuring device 10 of the present invention, there will be no damage caused to the engine 40 by detached lumps of ice and snow L.

By means of this temperature measuring device, the following effects can be obtained.

a. Because the sensor housing section 22 is formed so that adhered lumps of ice and snow L do not grow large, no damage will be caused to the engine 40 by lumps of ice and snow L.

b. Since there is no need for a heating mechanism to prevent the adhesion of ice and snow, accurate temperature measurement is possible without the need for an energy source or space for a heating mechanism, and it is possible for the size of the temperature measuring device 10 to be reduced.

c. Since the measured temperature T is at the surface of the airflow traversing surfaces 23 using temperature sensor 30, it is possible to derive the total temperature T1 without the use of a conventionally used stagnation temperature measuring device having a structure on which ice and snow build up easily and with which the temperature measuring device itself maybe damaged

What is claimed is:

1. A temperature measuring device consisting of a single wedge shaped casing arranged within an airflow flowing into an engine of an aircraft or on an external surface of an airframe of the aircraft, wherein a temperature sensor is provided in said single wedge shaped casing;

wherein the temperature measuring device measures a total temperature T1 of the airflow based on a measured temperature T of the airflow flowing over surfaces of the casing, and wherein (i) an angle of inclination of each blade surface of the casing with respect to a direction of a line of flow of the airflow, (ii) a width of a leading edge section of the casing with respect to the direction of the line of flow of the airflow, and (iii) an angle of inclination of the leading edge section of the casing with respect to the direction of the line of flow of the airflow are set such that lumps of ice and snow, which may form on the surfaces of the casing and which may detach from the casing and be blown downstream by the airflow into the engine, the airframe or other equipment of the aircraft, detach at a stage of growth so as to prevent damage to the engine, the airframe or the other equipment of the aircraft.

2. A temperature measuring device according to claim 1, wherein the angle of inclination of each blade surface of the casing with respect to the direction of the line of flow of the airflow is less than or equal to 9°.

3. A temperature measuring device according to claim 1, wherein a width of a leading edge section of the casing with respect to the direction of the line of flow of the airflow is less than or equal to 1 mm.

4. A temperature measuring device according to claim 1, wherein a width of a leading edge section of the casing with respect to the direction of the line of flow of the airflow is less than or equal to 0.5 mm.

5. A temperature measuring device according to claim 1, wherein an angle of inclination of a leading edge section of the casing with respect to the direction of the line of flow of the airflow is less than 60°.

* * * * *